US011737014B2

United States Patent
Duan et al.

(10) Patent No.: US 11,737,014 B2
(45) Date of Patent: Aug. 22, 2023

(54) SERVICE PROCESSING METHOD AND DEVICE

(71) Applicant: HUAWEI TECHNOLOGIES CO., LTD., Shenzhen (CN)

(72) Inventors: Xiaoyan Duan, Beijing (CN); Yue He, Beijing (CN); Hui Jin, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 420 days.

(21) Appl. No.: 16/490,561

(22) PCT Filed: Apr. 6, 2017

(86) PCT No.: PCT/CN2017/079530
§ 371 (c)(1),
(2) Date: Sep. 1, 2019

(87) PCT Pub. No.: WO2018/157439
PCT Pub. Date: Sep. 7, 2018

(65) Prior Publication Data
US 2020/0077327 A1    Mar. 5, 2020

(30) Foreign Application Priority Data

Mar. 1, 2017   (CN) .................... 201710117512.X

(51) Int. Cl.
*H04W 48/18*    (2009.01)
*H04W 8/02*    (2009.01)
(Continued)

(52) U.S. Cl.
CPC ............. *H04W 48/18* (2013.01); *H04W 8/02* (2013.01); *H04W 48/16* (2013.01); *H04W 72/56* (2023.01);
(Continued)

(58) Field of Classification Search
CPC ....... H04W 48/18; H04W 8/02; H04W 48/16; H04W 72/10; H04W 74/0833; H04W 76/11; H04W 72/56
See application file for complete search history.

(56) References Cited

U.S. PATENT DOCUMENTS

2011/0228931 A1   9/2011  Grube et al.
2017/0079059 A1*  3/2017  Li ..................... H04W 16/02
(Continued)

FOREIGN PATENT DOCUMENTS

CN      105813195 A    7/2016
CN      106375987 A    2/2017
(Continued)

OTHER PUBLICATIONS

Menglan Jiang et al.,"Network slicing management and prioritization in 5G mobile systems",European Wireless 2016, total 6 pages.
(Continued)

*Primary Examiner* — Jamal Javaid
*Assistant Examiner* — Ryan C Kavleski
(74) *Attorney, Agent, or Firm* — Huawei Technologies Co., Ltd.

(57) ABSTRACT

Embodiments of the present invention provide a service processing method and device. The service processing method includes: receiving a first message, where the first message includes first information of a first network slice, a priority corresponding to the first information, second information of a second network slice, and a priority corresponding to the second information; and preferentially processing a service of the high-priority network slice based on the priorities when a service of the first network slice collides with a service of the second network slice.

19 Claims, 8 Drawing Sheets

(51) Int. Cl.
*H04W 76/11* (2018.01)
*H04W 48/16* (2009.01)
*H04W 74/08* (2009.01)
*H04W 72/56* (2023.01)

(52) U.S. Cl.
CPC ........ *H04W 74/0833* (2013.01); *H04W 76/11* (2018.02)

(56) References Cited

U.S. PATENT DOCUMENTS

| | | | | |
|---|---|---|---|---|
| 2017/0303259 A1* | 10/2017 | Lee | ........................ | H04W 28/16 |
| 2017/0339688 A1* | 11/2017 | Singh | .................. | H04W 72/048 |
| 2018/0199334 A1* | 7/2018 | Ying | .................... | H04W 72/042 |
| 2018/0227871 A1* | 8/2018 | Singh | .................... | H04W 48/18 |
| 2018/0249441 A1* | 8/2018 | Ryoo | .................... | H04W 68/02 |
| 2019/0021047 A1 | 1/2019 | Zong | | |
| 2021/0409938 A1* | 12/2021 | Yang | .................... | H04W 16/02 |

FOREIGN PATENT DOCUMENTS

| | | | | |
|---|---|---|---|---|
| CN | 106412905 A | | 2/2017 | |
| EP | 2204053 B1 | | 5/2019 | |
| WO | 2009042840 A1 | | 4/2009 | |
| WO | WO-2009042840 A1 * | | 4/2009 | ......... H04L 12/1485 |
| WO | 2016150511 A1 | | 9/2016 | |
| WO | WO-2018141945 A1 * | | 8/2018 | |

OTHER PUBLICATIONS

S2-165762 Qualcomm Incorporated,"Way forward on Solutions for Key Issue 1 on Network Slicing",SA WG2 Meeting #116bis,Oct. 17-21, 2016, Kaohsiung, Taiwan,total 8 pages.
S2-170777 Nokia,"On whether an optional Single Value NSSAI is also needed",SA WG2 Meeting #119,Feb. 13-17, 2017, Dubrovnik, Croatia,total 5 pages.
S2-166603 Motorola Mobility, Lenovo,"Interim agreement: Determination of NSSAI based on UE policy",SA WG2 Meeting #118,Nov. 14-28, 2016, Reno, Nevada,total 3 pages.
S2-171528 Motorola Mobility et al.,"23.501: UE Traffic Routing",SA WG2 Meeting #119,Feb. 13-17, 2017, Dubrovnik, Croatia,total 7 pages.
S2-166544 Qualcomm Incorporated,"Update and evaluation of solution 6.17.1 for Key Issue 17 on Network Discovery and Selection in idle mode",SA WG2 Meeting #118,Nov. 14-18, 2016, Reno (NV), USA,total 5 pages.
S2-171187 InterDigital,"UE Policy Provisioning",SA WG2 Meeting #119,Feb. 13-17, 2017, Dubrovnik, HR,total 6 pages.
S2-170139 Ericsson et al.,"Network Slice Selection Assistance Information",SA WG2 Meeting #118BIS,Jan. 16-20, 2017 Spokane, WA, USA,total 3 pages.
3GPP TR 23.799 V14.0.0 (Dec. 2016),3rd Generation Partnership Project;Technical Specification Group Services and System Aspects; Study on Architecture for Next Generation System(Release 14),total 522 pages.

* cited by examiner

SERVICE PROCESSING METHOD AND DEVICE

TECHNICAL FIELD

This application relates to the communications field, and more specifically, to a service processing method and device in the communications field.

CROSS-REFERENCE TO RELATED APPLICATIONS

This application is a national stage of International Application No. PCT/CN2017/079530, filed on Apr. 6, 2017, which claims priority to Chinese Application No. 201710117512.X, filed on Mar. 1, 2017. Both of the aforementioned applications are hereby incorporated by reference in their entireties.

BACKGROUND

A rapidly developing wireless communications system needs to meet service requirements in a plurality of scenarios, for example, a mobile broadband service (for example, high-definition video), massive machine type communication, and highly-reliable mobile device communication (for example, vehicle communication). A network slicing (Network Slicing, NS) method may be used to meet service requirements in different scenarios. A network slice may be defined as a set of logical network function entities supporting communication service requirements in particular scenarios, for example, a network slice supporting massive machine type communication (Massive Internet of Things, mIoT), a network slice supporting an evolved mobile broadband (evolved Mobile Broadband, eMBB) service, and a network slice supporting an emergency service (Critical Communication, CriC).

A 5th generation (5th Generation, 5G) communications system is required to support a terminal in simultaneously accessing a plurality of different network slices, to use services provided by the plurality of different network slices. For example, the terminal may simultaneously access a network slice supporting MBB and the network slice supporting the CriC.

The terminal may access the plurality of network slices, and receive signaling (that is, a message) and data from the plurality of network slices and/or send signaling or data to the plurality of network slices. A collision may occur during processing of the signaling and/or data of the different network slices. For example, when processing data or signaling of a network slice A, the terminal receives to-be-processed data or signaling of a network slice B; the terminal simultaneously receives data or signaling of a network slice A and data or signaling of a network slice B; or the terminal cannot simultaneously process data or signaling of a network slice A and data or signaling of a network slice B due to insufficient resources. When the terminal simultaneously accesses the plurality of network slices, and a collision occurs during processing of the signaling and/or data of the different network slices, how the terminal processes the collision is a problem that needs to be resolved.

If the collision cannot be properly resolved, a service that needs to be urgently or preferentially processed may not be processed in time. Consequently, a requirement of a particular network slice (a tenant) and/or a terminal user cannot be met. For example, an emergency session establishment request delivered by a network slice used for the CriC may not be processed in time. Consequently, a management/control requirement of a network slice tenant (for example, an administrative/safety management department) cannot be met, and even safety of the terminal user is affected. For another example, a corporate network A and a public network B are network slices of an eMBB type. A manager of the corporate network A expects that terminals of users (who are mainly employees) in the corporate network A can preferentially process an eMBB service request of the corporate network A. However, actually, a service of the public network B is preferentially processed. Consequently, the employees in the corporate A cannot respond to a working request (for example, a video conference call inbound request) in time.

SUMMARY

Embodiments of this application provide a service processing method and device, to preferentially process a service request of an emergency or important network slice when services of a plurality of network slices collide.

According to a first aspect, a service processing method is provided, including: receiving, by a terminal, a first message, where the first message includes first information of a first network slice, a priority corresponding to the first information, second information of a second network slice, and a priority corresponding to the second information; and preferentially processing, by the terminal, a service of the high-priority network slice based on the priorities when a service of the first network slice collides with a service of the second network slice.

When receiving a high-priority service request (for example, an emergency communication service) in a process of processing a low-priority service, the terminal suspends processing (signaling processing or data transmission) of the low-priority service, and processes the high-priority service request. When simultaneously receiving two service requests, the terminal first processes a high-priority service. When having insufficient resources, the terminal may release a resource used for a low-priority service, and then process a high-priority service.

In this embodiment of this application, the foregoing priority information may be alternatively preconfigured on the terminal.

In this embodiment of this application, the collision includes: when processing data or signaling of a network slice A, the terminal receives to-be-processed data or signaling of a network slice B; the terminal simultaneously receives data or signaling of a network slice A and data or signaling of a network slice B; or the terminal cannot simultaneously process data or signaling of a network slice A and data or signaling of a network slice B due to insufficient resources.

In this embodiment of this application, the terminal determines the first information of the first network slice, the priority corresponding to the first information, the second information of the second network slice, and the priority corresponding to the second information, to preferentially process the service of the high-priority network slice based on the priorities when the service of the first network slice collides with the service of the second network slice. In this way, the terminal can preferentially process a service request of an emergency or important network slice.

In this embodiment of this application, the first information of the network slice includes one or more of the following: an identifier of the network slice, a network slice instance identifier, single network slice selection assistance information S-NSSAI, or a slice/service type; and the second information of the network slice includes one or more of the following: an identifier of the network slice, a network slice instance identifier, single network slice selection assistance information S-NSSAI, or a slice/service type.

In some possible implementations, the first message is a registration accept message, and before the terminal receives the registration accept message, the method further includes: sending, by the terminal, a registration request message to an access network device.

Specifically, the terminal may send a registration request to an AMF. In this way, when the AMF returns a registration accept to the terminal, the registration accept may include the first information of the network slice, the priority corresponding to the first information, the second information of the second network slice, and the priority corresponding to the second information.

Optionally, the registration request message may further include network slice selection assistance information NSSAI. The NSSAI is used by a network device to select, for the terminal, a network slice that allows to be used by the terminal.

In some possible implementations, when a priority of the first network slice is the same as a priority of the second network slice, the terminal preferentially processes a service of a high-load network slice; or the terminal randomly selects a network slice, and processes a service of the selected network slice; or the terminal preferentially processes a service that is of a network slice and that arrives first.

In some possible implementations, the terminal may further determine a priority of a service type, and process a service request of a network slice based on the priority of the service type. In this way, the terminal processes a service request based on a priority of a service type of a service corresponding to the service request, without considering which network slice the service request belongs to.

According to a second aspect, this application provides a service processing method, including: receiving, by an access and mobility management function AMF, a first message, where the first message includes first information of one or more network slices that a terminal subscribes to and a priority corresponding to the first information; and preferentially processing, by the AMF, a service of the high-priority network slice based on the priority when services of the plurality of network slices collide.

Specifically, the AMF may process (including forwarding) signaling of different network slices based on the priority, or the AMF may provide the priority for an access network device, so that the access network device processes (including forwarding) signaling of different network slices based on the priority.

When receiving a high-priority service request (for example, an emergency communication service) in a process of processing a low-priority service, the AMF or the access network device suspends processing (signaling processing or data transmission) of the low-priority service, and processes the high-priority service request. When simultaneously receiving two service requests, the AMF or the access network device first processes a high-priority service. When having insufficient resources, the AMF or the access network device may release a resource used for a low-priority service, and then process a high-priority service.

In this embodiment of this application, the first information of the one or more network slices that the terminal subscribes to and the priority corresponding to the first information are determined, so that the service of the high-priority network slice can be preferentially processed based on the priority when the services of the plurality of network slices collide. In this way, a service request of an emergency or important network slice can be preferentially processed.

In this embodiment of this application, the first information of the network slice may include an identifier of the network slice, a network slice instance identifier, a slice/service type, or single network slice selection assistance information S-NSSAI.

In some possible implementations, the receiving, by an AMF, a first message includes:
receiving, by the AMF, the first message sent by a second device, where the first message includes the first information of the one or more network slices that the terminal subscribes to and the priority corresponding to the first information, and the second device is a user data management UDM or a policy control function PCF; and
before the receiving, by an AMF, a first message, the method further includes: sending, by the AMF, a first request to the second device, where the first request is used to request the first information of the one or more network slices that the terminal subscribes to and the priority corresponding to the first information.

When the AMF sends the first request to the PCF, and the PCF does not have subscription data of the terminal, the PCF may further request the subscription data of the terminal from the UDM. The PCF determines priority information of the network slice based on the subscription data sent by the UDM.

In some possible implementations, the receiving, by an AMF, a first message includes:
receiving, by the AMF, the first message sent by a policy function entity PCF, where the first message includes the priority corresponding to the first information of the network slice; and
before the receiving, by an AMF, a first message, the method further includes: sending, by the AMF, a second request to the policy function entity PCF, where the second request is used to request a priority of a network slice that the terminal subscribes to, and the second request includes the first information.

It may be understood that the second request includes first information of a network slice, indicating that the AMF requests priority information of a particular network slice (for example, an NSI 1) from the PCF. In this case, the first message returned by the PCF to the AMF may include only a priority of the particular network slice.

In some possible implementations, after the receiving, by an AMF, a first message, the method further includes:
sending, by the AMF, a registration accept message to an access network device, where the registration accept message includes the first information of the one or more network slices that the terminal subscribes to and the priority corresponding to the first information; and
before the receiving, by the AMF, a first message, the method further includes: receiving, by the AMF, a registration request message that is sent by the terminal and forwarded by the access network device.

Optionally, the registration request message may include network slice selection assistance information NSSAI, and may be used by a network device to select a network slice for the terminal.

In some possible implementations, when the plurality of network slices have a same priority, the AMF preferentially processes a service of a high-load network slice; or the AMF randomly selects a network slice, and processes a service of the selected network slice; or the AMF preferentially processes a service that is of a network slice and that arrives first.

In some possible implementations, the AMF may further determine a priority of a service type, and send the priority of the service type to the terminal, so that the terminal processes a service request of a network slice based on the priority of the service type. In this way, the terminal processes a service request based on a priority of a service type of a service corresponding to the service request, without considering which network slice the service request belongs to.

According to a third aspect, an embodiment of the present invention provides a device, configured to perform the method in any one of the first aspect or the possible implementations of the first aspect. Specifically, the device includes a module configured to perform the method in any one of the first aspect or the possible implementations of the first aspect.

According to a fourth aspect, an embodiment of the present invention provides a device, configured to perform the method in any one of the second aspect or the possible implementations of the second aspect. Specifically, the device includes a module configured to perform the method in any one of the second aspect or the possible implementations of the second aspect.

According to a fifth aspect, an embodiment of the present invention provides a device. The device includes a memory, a processor, and a transceiver. The memory is configured to store an instruction. The processor is configured to execute the instruction stored in the memory. When the processor executes the instruction stored in the memory, the execution enables the processor to perform the method in any one of the first aspect or the possible implementations of the first aspect.

According to a sixth aspect, an embodiment of the present invention provides a device. The device includes a memory, a processor, and a transceiver. The memory is configured to store an instruction. The processor is configured to execute the instruction stored in the memory. When the processor executes the instruction stored in the memory, the execution enables the processor to perform the method in any one of the second aspect or the possible implementations of the second aspect.

According to a seventh aspect, an embodiment of the present invention provides a computer-readable medium, configured to store a computer program. The computer program includes an instruction used to perform the method in any one of the first aspect or the possible implementations of the first aspect.

According to an eighth aspect, an embodiment of the present invention provides a computer-readable medium, configured to store a computer program. The computer program includes an instruction used to perform the method in any one of the second aspect or the possible implementations of the second aspect.

DESCRIPTION OF EMBODIMENTS

Figure 1:
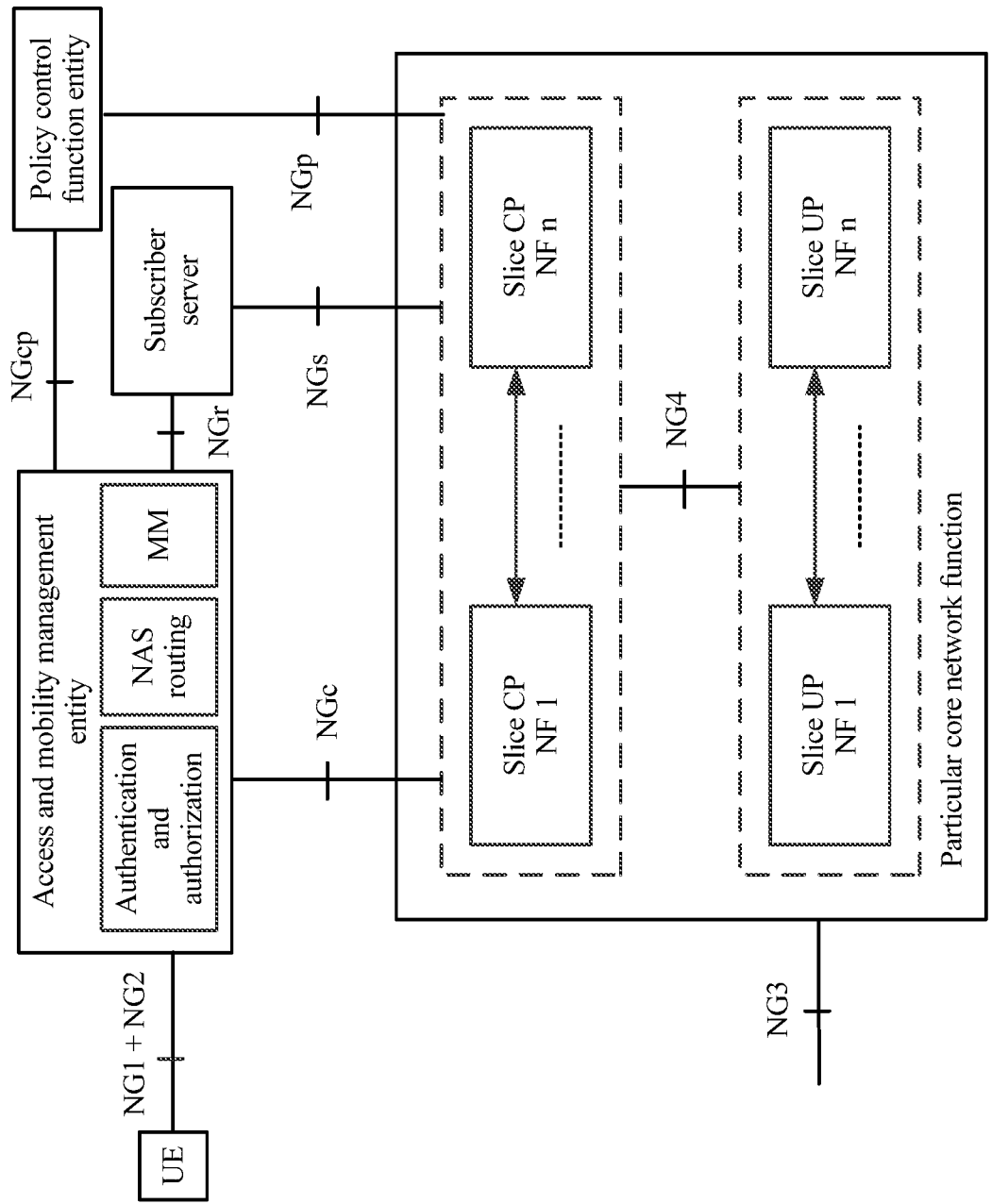
FIG. 1 is an architectural diagram of a network slice according to an embodiment of this application.

FIG. 1 shows a current basic network slice architecture proposed by the 3rd generation partnership project (3rd Generation Partnership Project, 3GPP) for an architecture design of a 5G core network. A plurality of network slices may share an access and mobility management function (Access and Mobility Management Function, AMF). In addition, the plurality of network slices have respective control plane network function entities (for example, a slice CP NF 1 to a slice CP NF n shown in FIG. 1) and respective user plane network function entities (for example, a slice UP NF 1 to a slice UP NF n shown in FIG. 1). The plurality of network slices may share a radio access network (Radio Access Network, RAN).

Figure 2:
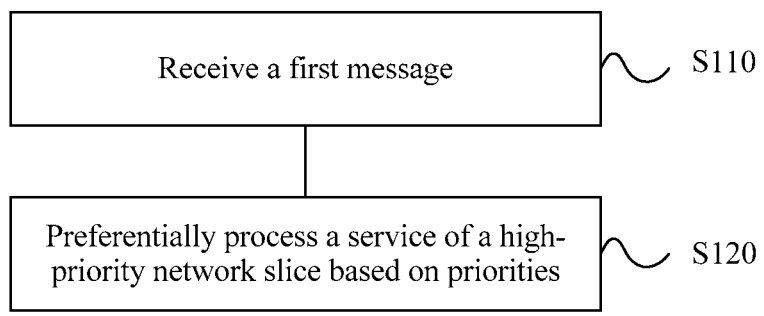
FIG. 2 is a schematic flowchart of a service processing method according to an embodiment of this application.

FIG. 2 is a schematic flowchart of a service processing method according to an embodiment of this application. The method may be performed by a terminal, an access and mobility management function (Access and Mobility Management Function, AMF), and an access network device. In this embodiment of this application, the AMF may include mobility management (Mobility Management, MM) and authentication (Authentication, AU) functions. The terminal may also be referred to as user equipment (User Equipment, UE). The access network device may also be referred to as an access network or an access network node. The method includes the following steps:

S110. Determine a first message, where the first message includes first information of a first network slice, a priority corresponding to the first information, second information of a second network slice, and a priority corresponding to the second information.

S120. Preferentially process a service of the high-priority network slice based on the priorities when a service of the first network slice collides with a service of the second network slice.

In this embodiment of this application, the collision includes: when processing data or signaling of a network slice A, the terminal receives to-be-processed data or signaling of a network slice B; the terminal simultaneously receives data or signaling of a network slice A and data or signaling of a network slice B; or the terminal cannot simultaneously process data or signaling of a network slice A and data or signaling of a network slice B due to insufficient resources.

In this embodiment of this application, priority information may be provided for the terminal in a manner of preconfiguring the priority information on the terminal or configuring the priority information for the terminal by a policy control function (Policy Control Function, PCF), a device configuration server, or another network function entity, so that the terminal can process service requests of different network slices based on the priority information.

This embodiment of this application is also applicable to resolving a collision when an AMF shared by a plurality of network slices processes signaling of different network slices. Specifically, priority information provided by a user data management (User Data Management, UDM) or a policy function entity shared by network slices is also provided for the AMF, so that the AMF perform processing (including forwarding) on the signaling of the different network slices based on priorities. In this embodiment of this application, the UDM may also be referred to as a subscriber database or a subscriber data management (Subscriber Data Management, SDM) function entity.

This embodiment of this application may also be applicable to resolving a collision when an access network function entity or an access network device processes signaling of different network slices. Specifically, the AMF may alternatively provide priorities to the access network device, so that the access network device performs processing (including forwarding) on signaling of different network slices based on the priorities.

Specifically, when receiving a high-priority service request (for example, an emergency communication service) in a process of processing a low-priority service, the terminal (or the AMF/access network device) suspends processing (signaling processing or data transmission) of the low-priority service, and processes the high-priority service request. When simultaneously receiving two service requests, the terminal (or the AMF/access network device) first processes a high-priority service. When having insufficient resources, the terminal (or the AMF/access network device) may release a resource used for a low-priority service, and then process a high-priority service.

When the plurality of network slices have a same priority, the terminal (or the AMF/access network device) preferentially processes a service of a high-load network slice; or the terminal (or the AMF/access network device) randomly selects a network slice, and processes a service of the selected network slice; or the terminal (or the AMF/access network device) preferentially processes a service that is of a network slice and that arrives first.

In this embodiment of this application, the first information of the first network slice, the priority corresponding to the first information, the second information of the second network slice, and the priority corresponding to the second information are determined, so that the service of the high-priority network slice can be preferentially processed based on the priorities when the service of the first network slice collides with the service of the second network slice. In this way, the terminal can preferentially process a service request of an emergency or important network slice.

In subsequent descriptions of this specification, unless otherwise specified, a network slice instance (Network Slice Instance, NSI) may be a network slice NS in a general sense, or may be particularly one or more network slice instances, for example, one or more network slices of a particular type, one or more network slices providing a particular network type, one or more network slices that belong to a particular network slice tenant (tenant), for example, a company, a management agency, or an operator, one or more network slices providing a particular application, or a particular type of one or more network slices that belong to a particular network slice tenant.

Figure 3A:
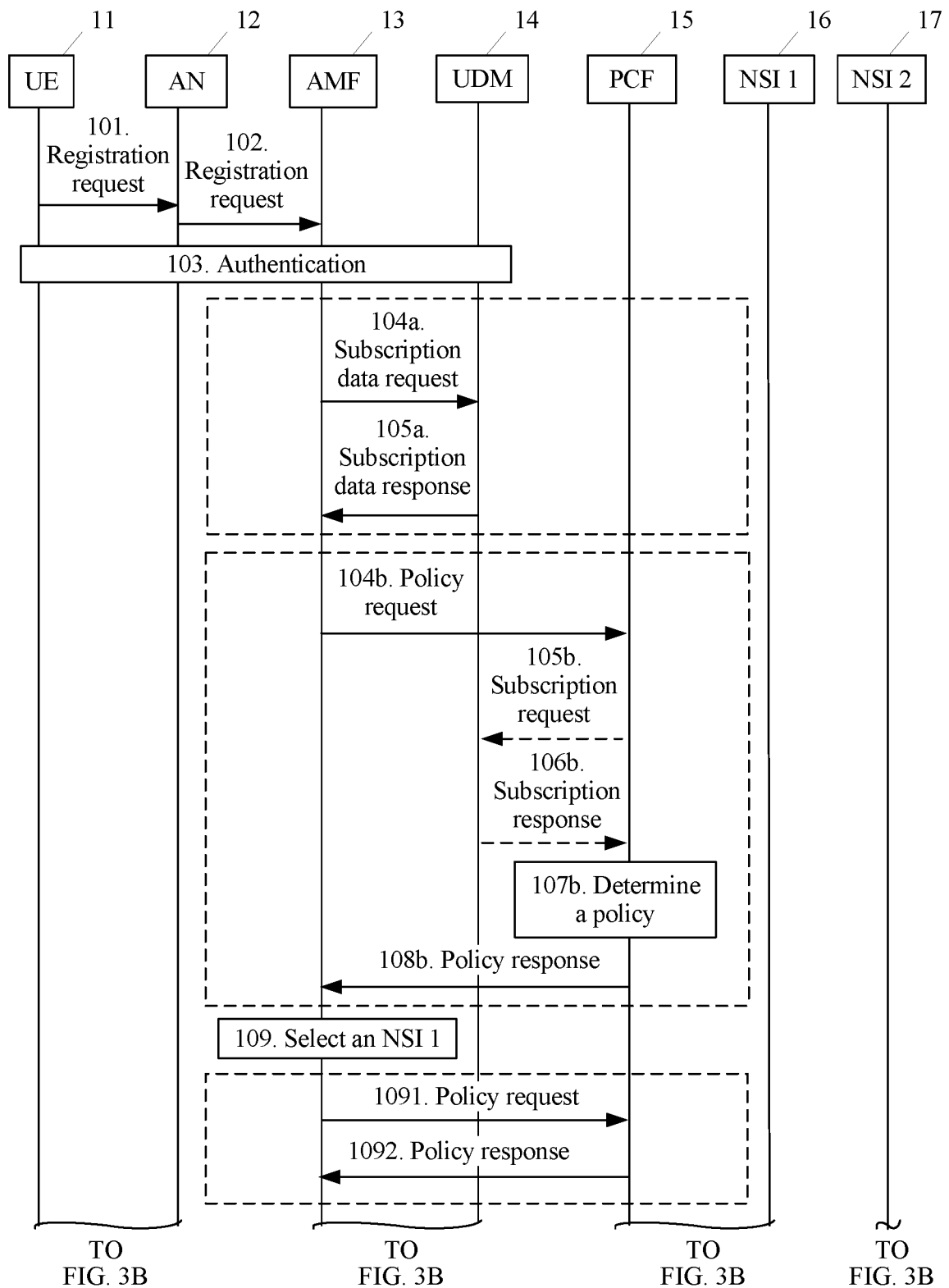
FIG. 3A and FIG. 3B are a schematic interaction diagram of a service processing method according to another embodiment of this application.
Figure 3B:
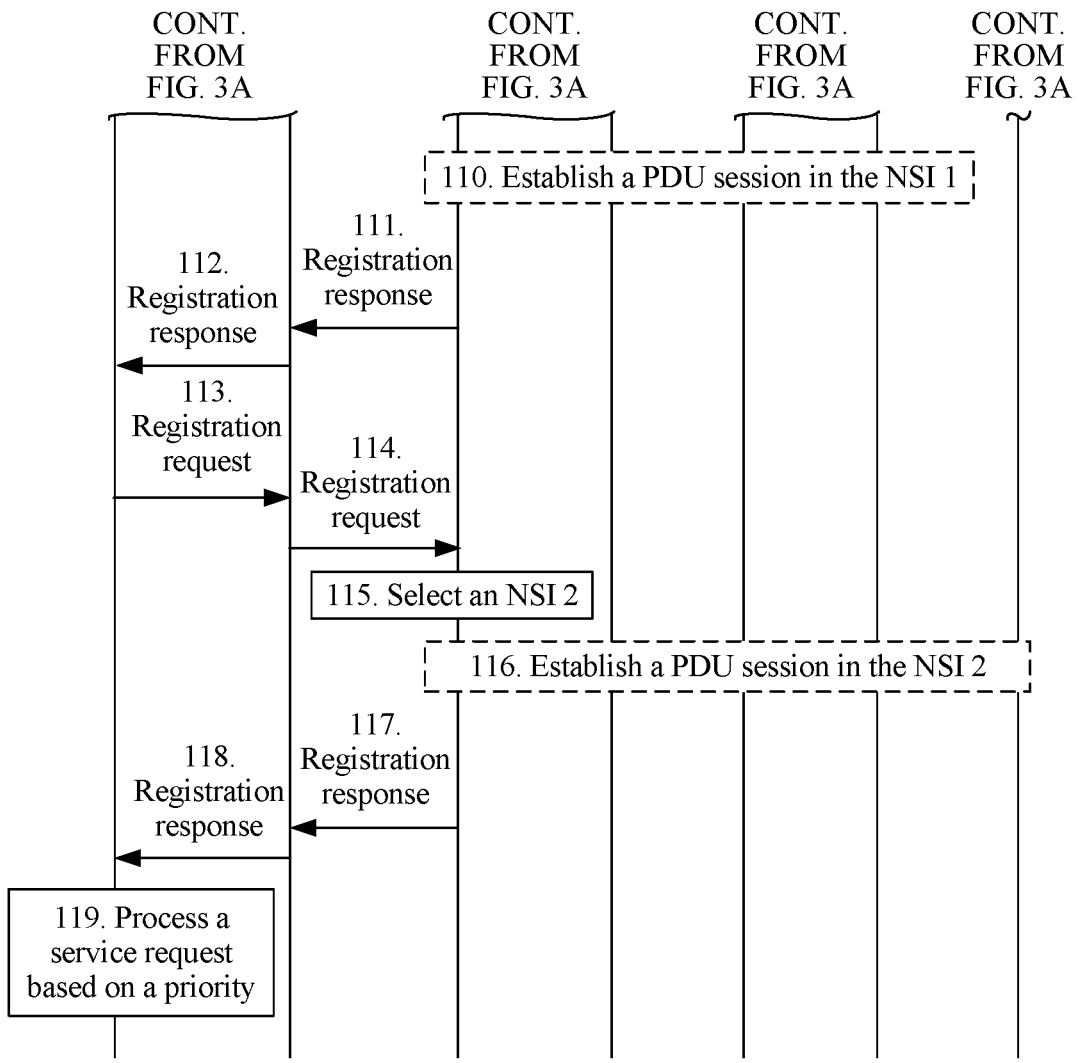

FIG. 3A and FIG. 3B are a schematic interaction diagram of a service processing method according to a specific embodiment of this application. It should be understood that FIG. 3A and FIG. 3B show steps or operations of the service processing method. However, these steps or operations are merely an example, and other operations or variants of the operations in FIG. 3A and FIG. 3B may be alternatively performed in this embodiment of this application. In addition, the steps in FIG. 3A and FIG. 3B may be performed based on a sequence different from a sequence presented in FIG. 3A and FIG. 3B, and not all operations in FIG. 3A and FIG. 3B need to be performed. The method shown in FIG. 3A and FIG. 3B includes the following steps.

101. A terminal 11 sends a registration request to an access network device 12. A type of the registration request may be, for example, initial registration (Initial Registration), mobility registration update (Mobility Registration Update), or periodic registration update (Periodic Registration Update). The registration request may include network slice selection assistance information (Network Slice Selection Assistance Information, NSSAI). The NSSAI may be used by a core network to select a network slice for the terminal. If the registration request does not include the NSSAI, the core network may select a default network slice for the terminal based on information such as subscription of the terminal and a capability of the terminal. 102. The access network device 12 forwards the registration request of the terminal 11 to an AMF 13.

103. The AMF 13 authenticates the terminal 11. If the authentication succeeds, the AMF (for example, a default AMF) that initially receives the registration request may select, for the terminal based on information such as the NSSAI and the subscription of the terminal, another more suitable AMF to serve the terminal, and directly forward (or forward by using the access network device) the registration request to the AMF. The AMF may be referred to as a serving AMF (Serving AMF) of the terminal. If the AMF (for example, the default AMF) that initially receives the registration request determines that the AMF serves the terminal, the AMF processes the registration request of the terminal, that is, does not forward the registration request to another AMF. The AMF that initially receives the registration request is a serving AMF of the terminal. An AMF in subsequent steps 104 to 112 is the serving AMF of the terminal.

It should be noted that, in this embodiment of this application, step 103 may be alternatively performed after steps 104a and 105a.

In the following, a priority of a network slice may be obtained in a manner described in steps 104a and 105a, steps 104b to 108b, or steps 1091 and 1092. It may be understood that, in this embodiment of this application, the priority of the network slice may be obtained in any one of the three manners described in steps 104a and 105a, steps 104b to 108b, and steps 1091 and 1092. This is not limited in this application.

104a. The AMF 13 sends a subscription data request to a subscriber server UDM 14, to request subscription data of the terminal.

105a. The UDM 14 returns a subscription data response to the AMF 13, where the subscription data response includes information about a network slice that the terminal subscribes to.

Optionally, the information about the network slice may include an identifier of each network slice instance (Network Slice Instance Identifier, NSI ID) that the terminal subscribes to and that is supported by the AMF and priority (priority) information of each network slice instance. For example, for an NSI ID1, priority=1; for an NSI ID2, priority=2; and for an NSI ID3, priority=3. The priority herein is a positive integer ranging from 1 to N (N≥1), and a smaller priority value indicates a higher priority. In this embodiment of this application, a network slice instance identifier may be alternatively a network slice identifier.

Optionally, the information about the network slice may include a slice/service type (slice/service type) of the network slice that the terminal subscribes to and that is supported by the AMF and priority (priority) information of each slice/service type. For example, slice/service type=CriC, and priority=1; slice/service type=eMBB, and priority=2; and slice/service type=mIoT, and priority=3. The priority herein is an integer ranging from 1 to N (N≥1), and a smaller value indicates a higher priority. The slice/service type indicates a type of a service or a feature that can be provided by the network slice.

Optionally, the information about the network slice may include one or more pieces of S-NSSAI of the network slice that the terminal subscribes to and that is supported by the AMF and priority (priority) information corresponding to each piece of S-NSSAI. For example, S-NSSAI={slice/service type=CriC, Slice Differentiator=public (indicating that the network slice instance belongs to a public network)}, and priority=1; S-NSSAI={slice/service type=eMBB, Slice Differentiator=Company A (indicating a network slice instance tenanted by the company A)}, and priority=2; and S-NSSAI={slice/service type=eMBB, Slice Differentiator=public}, and priority=3. The priority herein is an integer ranging from 1 to N (N≥1), and a smaller value indicates a higher priority.

The NSSAI herein is a set of one or more pieces of single NSSAI (Single NSSAI, S-NSSAI). The S-NSSAI is used to describe one or more network slice instances, and content of the S-NSSAI includes a slice/service type (slice/service type) and information about a slice differentiator (Slice Differentiator). The slice/service type is used to describe a service or a feature of a network slice instance. The slice differentiator is supplementary information used to further differentiate a plurality of network slice instances when the network slice instances have a same slice/service type. The slice differentiator may be a tenant identifier (Tenant ID), used to identify a particular user, for example, a particular company, that tenants the network slice, or used to identify a particular application that tenants the network slice. Alternatively, the slice differentiator may be a slice identifier (Slice ID), used to identify a slice. Alternatively, the slice differentiator may be other supplementary information for slice description. This is not limited in this application.

In this embodiment of this application, the NSSAI may be shown in Table 1:

TABLE 1

S-NSSAI 1
S-NSSAI 2
S-NSSAI 3

In this embodiment of this application, a priority may be added to NSSAI in each row, to be specific, to each piece of S-NSSAI. NSSAI to which a priority is added may be shown in Table 2:

TABLE 2

| Slice/Service type = 1 | Slice Differentiator = 1 | Priority = 2 |
| Slice/Service type = 2 | Slice Differentiator = 2 | Priority = 1 |
| Slice/Service type = 3 | Slice Differentiator = 3 | Priority = 3 |

Each piece of S-NSSAI herein represents all network slices that meet a slice/service type and a slice differentiator.

There may be one or more pieces of S-NSSAI, and a priority of all the network slices is n. For example, the first row indicates all network slices (where a quantity may be greater than or equal to 1) that meet slice/service type=1 and slice differentiator=1, and a priority of all the network slices is 2. Each network slice (NSI) that the terminal subscribes to has corresponding S-NSSAI.

In this embodiment of this application, a priority of each piece of S-NSSAI may be further used as a parameter in parallel with the S-NSSAI. In this case, the NSSAI may be shown in Table 3:

TABLE 3

| S-NSSAI 1 | Priority = 2 |
| S-NSSAI 2 | Priority = 1 |
| S-NSSAI 3 | Priority = 3 |

In this embodiment of this application, the network slice identifier, the network slice instance identifier, the slice/service type, or the S-NSSAI may be referred to as first information of the network slice.

In this case, the AMF 13 may process subsequent service requests of different network slices based on a received NSI ID of a network slice and corresponding priority information, for example, preferentially process mobility management MM signaling of a high-priority slice, and preferentially forward session management SM signaling of the high-priority slice.

Alternatively, the AMF 13 may process subsequent service requests of network slices with different slice/service types based on a received slice/service type of a network slice and corresponding priority information, for example, preferentially process mobility management MM signaling of a network slice with a high-priority slice/service type, and preferentially forward session management SM signaling of the network slice with the high-priority slice/service type.

Alternatively, the AMF 13 may process subsequent service requests of network slices with different S-NSSAI based on received S-NSSAI of a network slice and corresponding priority information, for example, preferentially process mobility management MM signaling of a network slice with high-priority S-NSSAI, and preferentially forward session management SM signaling of the network slice with the high-priority S-NSSAI.

104b. The AMF 13 sends a policy request to a policy function entity PCF 15 shared by network slices, to request to obtain a policy related to the terminal. 105b. If the PCF 15 does not have subscription data of the terminal 11, the PCF 15 sends a subscription request to a UDM 14, to request the subscription data of the terminal 11, where the subscription request includes a terminal identifier, and optionally, may further include an AMF identifier.

106b. The UDM 14 returns a subscription response to the PCF 15.

Optionally, the subscription response includes an identifier NSI ID of each network slice instance that the terminal subscribes to. If the subscription request in step 105b includes the AMF identifier, the subscription response returned by the UDM may include an identifier NSI ID of each network slice instance that the terminal subscribes to and that is supported by the AMF.

Optionally, the subscription response may include a slice/service type slice/service type of a network slice that the terminal subscribes to. If the subscription request in step 105b includes the AMF identifier, the subscription response returned by the UDM may include a slice/service type of a network slice that the terminal subscribes to and that is supported by the AMF.

Optionally, the subscription response may include one or more pieces of S-NSSAI of a network slice that the terminal subscribes to. If the subscription request in step 105*b* includes the AMF identifier, the subscription response returned by the UDM may include S-NSSAI of a network slice that the terminal subscribes to and that is supported by the AMF.

107*b*. The PCF 15 determines priority information of each network slice that the terminal subscribes to.

Specifically, when the subscription response includes the identifier NSI ID of each network slice instance that the terminal subscribes to, in step 107*b*, the PCF 15 determines, based on information such as the identifier NSI ID of each network slice instance that the terminal subscribes to and that is supported by the AMF and a locally configured operator policy, priority information of each network slice instance that the terminal subscribes to and that is supported by the AMF, namely, priority information corresponding to each NSI ID. For example, an NSI ID1 corresponds to priority=1, an NSI ID2 corresponds to priority=2, and an NSI ID3 corresponds to priority=3.

Alternatively, when the subscription response may include the slice/service type slice/service type of the network slice that the terminal subscribes to, in step 107*b*, the PCF may determine, based on information such as the slice/service type of the network slice that the terminal subscribes to and that is supported by the AMF and a locally configured operator policy, priority information of a slice/service type slice/service type of each network slice that the terminal subscribes to and that is supported by the AMF, namely, priority information corresponding to each slice/service type. For example, slice/service type=CriC corresponds to priority=1, slice/service type=eMBB corresponds to priority=2, and slice/service type=mIoT corresponds to priority=3.

Alternatively, when the subscription response includes the one or more pieces of S-NSSAI of the network slice that the terminal subscribes to, the PCF determines, based on information such as the one or more pieces of S-NSSAI of the network slice that the terminal subscribes to and that is supported by the AMF and a locally configured operator policy, a priority corresponding to each piece of S-NSSAI that the terminal subscribes to and that is supported by the AMF. For example, S-NSSAI={slice/service type=CriC, Slice Differentiator=public} corresponds to priority=1, S-NSSAI={slice/service type=eMBB, Slice Differentiator=Company A} corresponds to priority=2, and S-NSSAI={slice/service type=eMBB, Slice Differentiator=public} corresponds to priority=3.

108*b*. The PCF 15 returns a policy response to the AMF 13.

Optionally, the policy response may include the identifier NSI ID of each network slice instance that the terminal subscribes to and that is supported by the AMF and the priority information of each network slice instance. For example, for the NSI ID1, priority=1, for the NSI ID2, priority=2, and for the NSI ID3, priority=3.

Optionally, the policy response may include the slice/service type of the network slice that the terminal subscribes to and that is supported by the AMF and the priority information of each slice/service type. For example, slice/service type=CriC, and priority=1; slice/service type=eMBB, and priority=2; and slice/service type=mIoT, and priority=3.

Optionally, the policy response may include the S-NSSAIs that the terminal subscribes to and that is supported by the AMF and the priority information corresponding to each piece of S-NSSAI. For example, S-NSSAI={slice/service type=CriC, Slice Differentiator=public}, and priority=1; S-NSSAI={slice/service type=eMBB, Slice Differentiator=Company A}, and priority=2; and S-NSSAI={slice/service type=eMBB, Slice Differentiator=public}, and priority=3.

In this case, the AMF 13 may process subsequent service requests of different network slices based on a received NSI ID of a network slice and corresponding priority information, for example, preferentially process mobility management MM signaling of a high-priority slice, and preferentially forward session management SM signaling of the high-priority slice.

Alternatively, the AMF 13 may process subsequent service requests of network slices with different slice/service types based on a received slice/service type of a network slice and corresponding priority information, for example, preferentially process mobility management MM signaling of a network slice with a high-priority slice/service type, and preferentially forward session management SM signaling of the network slice with the high-priority slice/service type.

Alternatively, the AMF 13 may process subsequent service requests of network slices with different S-NSSAI based on received S-NSSAI of a network slice and corresponding priority information, for example, preferentially process mobility management MM signaling of a network slice with high-priority S-NSSAI, and preferentially forward session management SM signaling of the network slice with the high-priority S-NSSAI.

109. The core network subscribes the terminal based on the NSSAI, or may further select a network slice instance for the terminal based on the information such as the subscription data of the terminal or the capability of the terminal, where it is assumed herein that an NSI 1 is selected.

The AMF 13 sends a policy request to a PCF 15, to request to obtain a policy related to the terminal.

Optionally, the policy request includes an NSI ID of the selected network slice NSI 1 16.

Optionally, the policy request may include a slice/service type of the selected network slice NSI 1 16.

Optionally, the policy request may include S-NSSAI of the selected network slice NSI 1 16.

1092. The PCF 15 determines priority information of the NSI 1 16, and sends a policy response to the AMF, where the policy response includes a priority of the NSI 1 16.

Optionally, the PCF 15 may determine the priority information of the NSI 1 16 based on information such as the NSI ID of the NSI 1 16 and a locally configured operator policy.

Optionally, the PCF 15 may determine priority information of the slice/service type of the NSI 1 based on information such as the slice/service type of the NSI 1 and a locally configured operator policy.

Optionally, the PCF 15 may determine priority information of the S-NSSAI of the NSI 1 based on information such as the S-NSSAI of the NSI 1 and a locally configured operator policy.

In this case, the AMF 13 may process a subsequent service request of the NSI 1 16 based on the priority information of the NSI 1 16, the priority information of the slice/service type of the NSI 1, or the priority information of the S-NSSAI of the NSI 1.

110. Optionally, if the registration request includes information for establishing a packet data session protocol data unit (Protocol Data Unit, PDU) session (session), the AMF 13 forwards the information for establishing a PDU session to a session management function (Session Management Function, SMF) entity in the NSI 1 16, and the SMF initiates PDU session establishment based on the information.

111. The AMF 13 sends a registration response, for example, an attach accept (Attach Accept) message or a tracking area update accept (Tracking Area Update Accept) message, to the access network device 12.

Optionally, the registration response may include a temporary identifier (Temp ID) assigned by the AMF to the terminal and the NSI ID of the NSI 1. The registration response further includes the identifier NSI ID of each network slice that the terminal subscribes to and that is supported by the AMF and the priority information of each network slice, or further includes only the priority information of the NSI 1.

Optionally, the registration response may include a Temp ID assigned by the AMF to the terminal. The registration response further includes the slice/service type of the network slice that the terminal subscribes to and that is supported by the AMF and the priority information of each slice/service type, or further includes only the slice/service type of the NSI 1 and the priority information of the slice/service type of the NSI 1.

Optionally, the registration response may include a Temp ID assigned by the AMF to the terminal. The registration response further includes the S-NSSAIs that the terminal subscribes to and that is supported by the AMF and the priority information corresponding to each piece of S-NSSAI, or further includes only the S-NSSAI of the NSI 1 and the priority information of the S-NSSAI of the NSI 1.

In this case, the access network device 12 may process subsequent service requests (including signaling and/or data) of different network slices based on a received NSI ID of a network slice and corresponding priority information, or a slice/service type and the priority information of the slice/service type of the NSI 1, or S-NSSAI and the priority information of the S-NSSAI of the NSI 1, for example, preferentially forward mobility management MM signaling of a high-priority slice and/or session management SM signaling of the high-priority slice. Alternatively, the access network device processes a subsequent service request of the NSI 1 based on the priority information of the NSI 1.

112. The access network device 12 forwards the registration response to the terminal.

The terminal processes subsequent service requests (including signaling and/or data) of different network slices based on corresponding priority information.

Optionally, the terminal may process subsequent service requests (including signaling and/or data) of different network slices based on a received NSI ID of a network slice and corresponding priority information. Particularly, for the NSI 1, the terminal processes a subsequent service request (for example, signaling carrying the NSI ID of the NSI 1, or user plane data of a PDU session established in the NSI 1) of the NSI 1 based on the priority information of the NSI 1.

Optionally, the terminal may process subsequent service requests (including signaling and/or data) of network slices with different slice/service types based on a received slice/service type of a network slice and corresponding priority information. Particularly, for the NSI 1, the terminal processes a subsequent service request (for example, signaling carrying the NSI ID of the NSI 1, or user plane data of a PDU session established in the NSI 1) of the NSI 1 based on the priority information of the slice/service type of the NSI 1.

Optionally, the terminal may process subsequent service requests (including signaling and/or data) of network slices with different S-NSSAI based on received S-NSSAI of a network slice and corresponding priority information. Particularly, for the NSI 1, the terminal processes a subsequent service request (for example, signaling carrying the NSI ID of the NSI 1, or user plane data of a PDU session established in the NSI 1) of the NSI 1 based on the priority information of the S-NSSAI of the NSI 1.

113 to 118. The terminal 11 registers with another network slice NSI 2 17. A procedure of steps 113 to 118 is basically the same as a procedure of steps 101 to 112. Differences lie in the following:

(1) In step 113, network slice selection assistance information NSSAI carried by the terminal may be different from the NSSAI in step 101. Therefore, an AMF in subsequent steps may be different from the AMF in steps 102 to 112. The AMF selects the NSI 2 for the terminal.

(2) If a serving AMF corresponding to the NSI 2 is different from a serving AMF corresponding to the NSI 1, and information about a network slice that the terminal subscribes to and that is supported by a particular serving AMF is provided in steps 104a and 105a or steps 104b to 108b, a procedure of steps 104a and 105a, steps 104b to 108b, or steps 1091 and 1092 needs to be performed in a procedure in which the terminal registers with the network slice NSI 2.

If the serving AMF corresponding to the NSI 2 is the same as the serving AMF corresponding to the NSI 1, and steps 104a and 105a (or steps 104b to 108b) are performed in a procedure in which the terminal registers with the network slice NSI 1, steps 104a and 105a (or steps 104b to 108b) may not be performed, and steps 1091 and 1092 do not need to be performed either in the procedure in which the terminal registers with the network slice NSI 2.

If the serving AMF corresponding to the NSI 2 is the same as the serving AMF corresponding to the NSI 1, and steps 1091 and 1092 are performed in the procedure in which the terminal registers with the network slice NSI 1, steps 104a and 105a, steps 104b to 108b, or steps 1091 and 1092 need to be performed in the procedure in which the terminal registers with the network slice NSI 2.

(3) The NSI 1 in steps 101 to 112 is replaced with the NSI 2.

119. The terminal 11 processes subsequent service requests (including signaling and/or data) of different network slices based on corresponding priority information.

Optionally, the terminal may process subsequent service requests (including signaling and/or data) of different network slices based on a received NSI ID of a network slice and corresponding priority information. Specifically, the terminal processes a subsequent service request (for example, signaling carrying the NSI ID of the NSI 1, or user plane data of a PDU session established in the NSI 1) of the NSI 1 and a subsequent service request (for example, signaling carrying an NSI ID of the NSI 2, or user plane data of a PDU session established in the NSI 2) of the NSI 2 based on the priority of the NSI 1 and a priority of the NSI 2.

Optionally, the terminal may process subsequent service requests (including signaling and/or data, the same below) of network slices with different slice/service types based on a received slice/service type of a network slice and corresponding priority information. Specifically, the terminal processes a subsequent service request (for example, signaling carrying the NSI ID of the NSI 1, or user plane data of a PDU session established in the NSI 1) of the NSI 1 and a subsequent service request (for example, signaling carrying an NSI ID of the NSI 2, or user plane data of a PDU session established in the NSI 2) of the NSI 2 based on a priority of the slice/service type of the NSI 1 and a priority of a slice/service type of the NSI 2.

Optionally, the terminal may process subsequent service requests (including signaling and/or data, the same below) of network slices with different S-NSSAI based on received S-NSSAI of a network slice and corresponding priority information. Specifically, the terminal processes a subsequent service request (for example, signaling carrying the NSI S-NSSAI of the NSI 1, or user plane data of a PDU session established in the NSI 1) of the NSI 1 and a subsequent service request (for example, signaling carrying S-NSSAI of the NSI 2, or user plane data of a PDU session established in the NSI 2) of the NSI 2 based on a priority of the S-NSSAI of the NSI 1 and a priority of the S-NSSAI of the NSI 2.

In this embodiment of this application, priorities of a plurality of network slices are determined, so that the terminal, the AMF, or the access network device can preferentially process a service of a high-priority network slice based on the priorities when services of the network slices collide. In this way, a service request of an emergency or important network slice can be preferentially processed.

Figure 4:
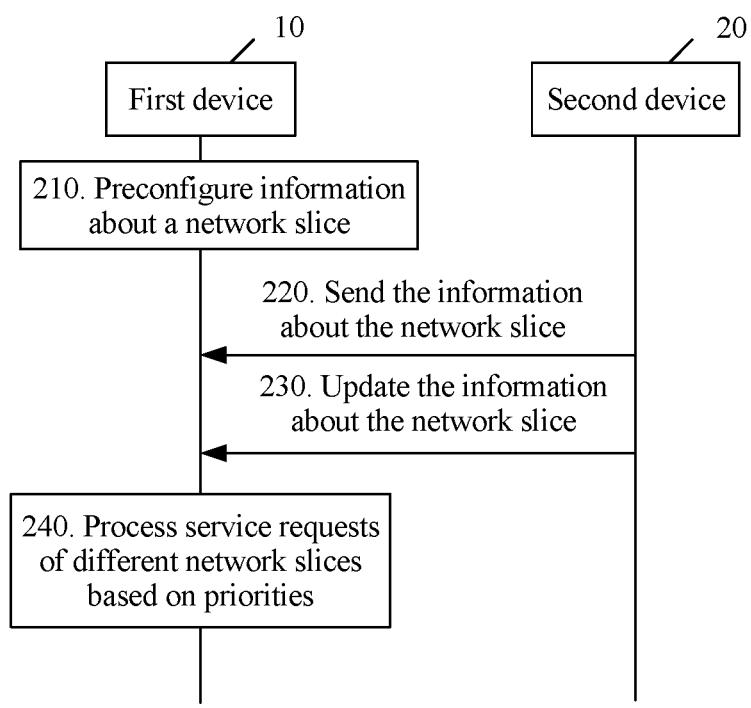
FIG. 4 is a schematic interaction diagram of a service processing method according to still another embodiment of this application.

In this embodiment of this application, a network slice priority may be alternatively provided for the terminal (or the access network device, or the AMF) in a manner of preconfiguring the network slice priority on the terminal (or the access network device, or the AMF) or configuring the network slice priority for the terminal (or the access network device, or the AMF) by a policy function entity/a device configuration server/another network function entity shared by network slices, so that the terminal (or the access network device, or the AMF) processes service requests of different slices based on priorities of the network slices. FIG. 4 is a schematic flowchart of a service processing method according to an embodiment of this application. In FIG. 4, a first device 10 may be a terminal, an access network device, or an AMF, and a second device 20 may be a PCF or a device configuration server. In the method shown in FIG. 4, one of steps 210 and 220 may be performed.

210. Preconfigure, on the first device 10, information about a network slice that the terminal subscribes to.

Optionally, the information about the network slice may include a priority of a network slice instance. For example, for an NSI ID1, priority=1; for an NSI ID2, priority=2; and for an NSI ID3, priority=3. The NSI ID1, the NSI ID2, and the NSI ID3 herein identify different network slice instances that the terminal subscribes to, and priorities (priority) of the network slice instances are 1, 2, and 3, respectively.

Optionally, the information about the network slice may include a slice/service type of the network slice and a priority of the slice/service type of the network slice. For example, slice/service type=CriC, and priority=1; slice/service type=eMBB, and priority=2; and slice/service type=mIoT, and priority=3.

Optionally, the information about the network slice may include S-NSSAI of the network slice and priority information corresponding to the S-NSSAI of the network slice. For example, S-NSSAI={slice/service type=CriC, Slice Differentiator=public}, and priority=1; S-NSSAI={slice/service type=eMBB, Slice Differentiator=Company A}, and priority=2; and S-NSSAI={slice/service type=eMBB, Slice Differentiator=public}, and priority=3.

Herein, when the first device 10 is the user equipment terminal, the "preconfiguring" may include: writing the information about the network slice into a subscriber identity module (Subscriber Identity Module, SIM) upgrade/enhancement module such as a SIM or a universal subscriber identity module (Universal SIM, USIM) of the terminal, writing the information about the network slice into a memory of the terminal by using software code before delivery of the terminal, or the like.

When the first device is the access network device or the AMF, the "preconfiguring" may include writing the information about the network slice into a memory of the device by using software code before delivery of the access network device or the AMF device.

220. The second device 20 sends or configures, to or for the terminal, the information about the network slice that the terminal subscribes to, where the second device, for example, is a policy function entity PCF, a device configuration server (Device Management Server, DMS), or another network function entity shared by network slices. For descriptions of the information about the network slice, refer to descriptions in step 210. To avoid repetition, details are not described herein again.

230. The second device 20 sends, to the terminal, updated information about a network slice instance that the terminal subscribes to.

For example, for the NSI ID1, priority=2; and for an NSI ID4, priority=4. Herein, a priority of a network slice that is identified by the NSI ID1 and that the terminal subscribes to is updated to 2; and a new network slice that is identified by the NSI ID4 and that the terminal subscribes to is added, and a priority of the new network slice is 4.

For another example, slice/service type=IoT CriC, and priority=1. Slice/service type=IoT CriC (an emergency service in machine type communication) is added herein, and a priority of the added slice/service type is also 1.

For still another example, S-NSSAI={slice/service type=eMBB, Slice Differentiator=Company A}, and priority=3; S-NSSAI={slice/service type=mIoT, Slice Differentiator= Company A}, and priority=4. Herein, a priority corresponding to S-NSSAI={slice/service type=eMBB, Slice Differentiator=Company A} herein is changed to 3; and S-NSSAI={slice/service type=mIoT, Slice Differentiator= Company A} is added, and a priority of the added S-NSSAI is 4.

240. The first device 10 processes service requests of different network slices based on corresponding priority information.

Optionally, subsequent service requests of different network slices may be processed based on a received NSI ID of a network slice and corresponding priority information.

Optionally, subsequent service requests of network slices with different slice/service types may be processed based on a received slice/service type of a network slice and corresponding priority information.

Optionally, subsequent service requests of network slices with different S-NSSAI may be processed based on received S-NSSAI of a network slice and corresponding priority information.

In this embodiment of this application, priorities of a plurality of network slices are determined, so that the terminal, the AMF, or the access network device can preferentially process a service of a high-priority network slice based on the priorities when services of the network slices collide. In this way, a service request of an emergency or important network slice can be preferentially processed.

Figure 5:
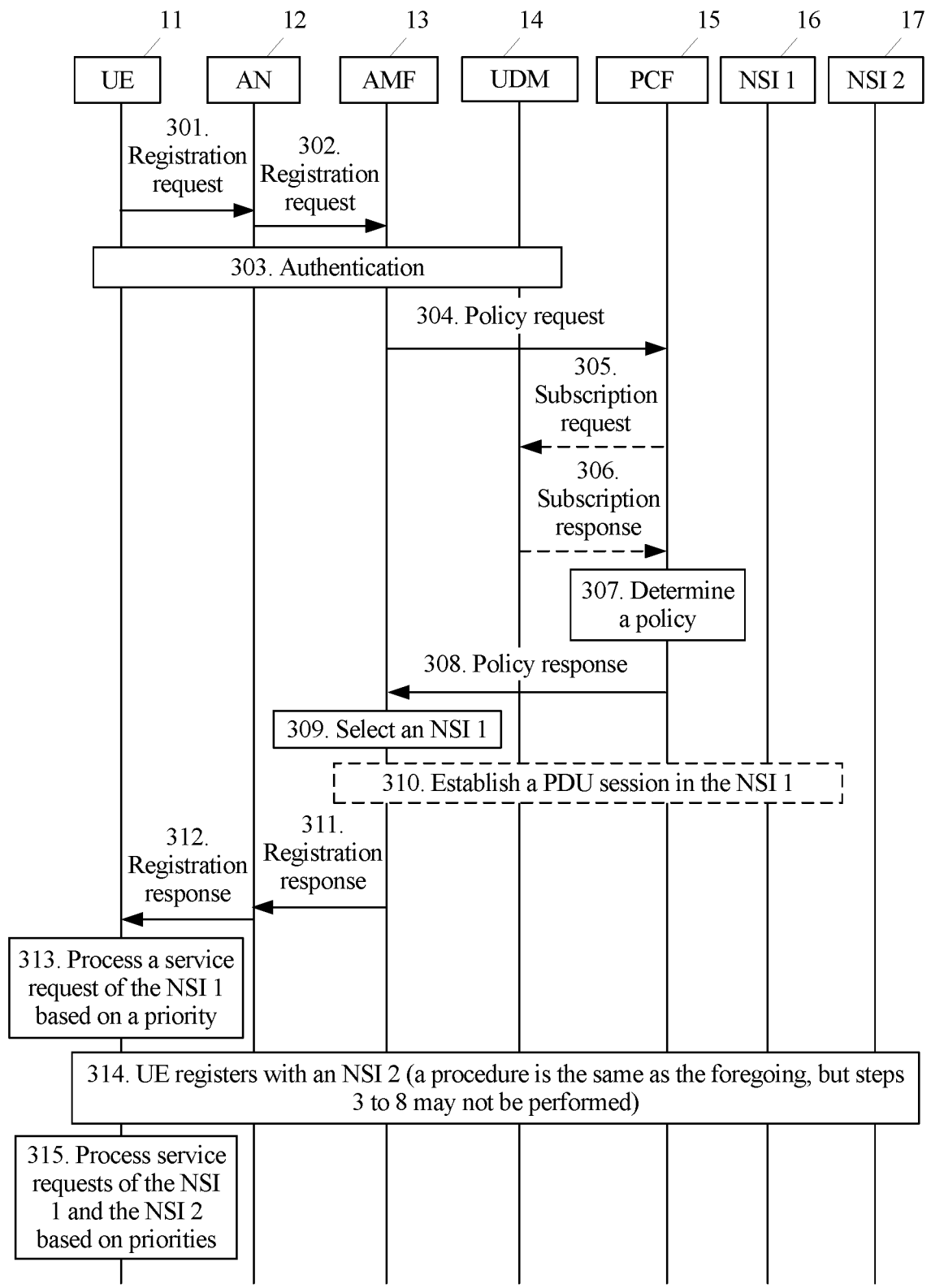
FIG. 5 is a schematic interaction diagram of a service processing method according to yet another embodiment of this application.

FIG. 5 is a schematic interaction diagram of a service processing method according to an embodiment of this application. It should be understood that FIG. 5 shows steps or operations of the service processing method. However, these steps or operations are merely an example, and other operations or variants of the operations in FIG. 5 may be alternatively performed in this embodiment of this application. In addition, the steps in FIG. 5 may be performed based on a sequence different from a sequence presented in FIG. 5, and not all operations in FIG. 5 need to be performed. In FIG. 5, a reference numeral the same as a reference numeral in FIG. 3A and FIG. 3B indicates a same or similar meaning. For brevity, details are not described herein again.

Steps 301 to 303 are the same as steps S101 to 303 in the method shown in FIG. 3A. For details, refer to descriptions in steps 301 to 303 in FIG. 3A. To avoid repetition, details are not described herein again.

304. The AMF sends a policy request to a policy function entity PCF shared by network slices, to request to obtain a policy related to the terminal.

305. If the PCF does not have subscription data of the terminal, the PCF sends a subscription request to the UDM, to request the subscription data of the terminal.

306. The UDM returns a subscription response to the PCF, where the subscription response includes a type of a service that the terminal subscribes to. If the subscription request in step 305 includes an AMF identifier, the subscription response returned by the UDM may include a type of a service that the terminal subscribes to and that is supported by the AMF.

307. The PCF determines, based on information such as the type of the service that the terminal subscribes to and that is supported by the AMF and a locally configured operator policy, priority information of the type of the service that the terminal subscribes to and that is supported by the AMF. For example, for the terminal, service type=eMBB_App1 (indicating an eMBB application type 1, for example, high-definition voice) corresponds to priority=1; for the terminal, service type=eMBB_App2 (indicating an eMBB application type 2, for example, high-definition video) corresponds to priority=2; and for the terminal, service type=mIoT corresponds to priority=3. The priority information of the service type is applicable to services of all slices that the terminal subscribes to and that are supported by the AMF, and therefore can be used as a slice common quality of service policy (NS Common QoS policy) or referred to as a part of a slice common policy (NS Common policy).

308. The PCF returns a policy response to the AMF, where the policy response includes the NS common QoS policy. The NS common QoS policy includes the type of the service that the terminal subscribes to and that is supported by the AMF and the priority information of the service type. For example, for the terminal, service type=eMBB_App1, and priority=1; for the terminal, service type=eMBB_App2, and priority=2; and for the terminal, service type=mIoT, and priority=3.

The AMF may process subsequent different service types of service requests of the terminal that belong to a same network slice or different network slices based on the type of the service that the terminal subscribes to and that is supported by the AMF and the priority information of the service type in the received NS common QoS policy, for example, preferentially process session management SM signaling related to a service whose service type has a high priority. Particularly, for an NSI 1, the AMF processes service requests of different services of the terminal in the NSI 1 based on the priority information of the type of the service that the terminal subscribes to.

Steps 309 and 310 are the same as steps 309 and 310 in the method shown in FIG. 3A and FIG. 3B. For details, refer to descriptions in steps 309 and 310 in FIG. 3A and FIG. 3B. To avoid repetition, details are not described herein again.

311. The AMF sends a registration response (for example, an attach accept Attach Accept message or a tracking area update accept Tracking Area Update Accept message) to an access network device, where the registration response includes a Temp ID assigned by the AMF to the terminal, and further includes the NS common QoS policy. The NS common QoS policy includes the type of the service that the terminal subscribes to (and that is supported by the AMF) and the priority information of the service type. For example, for the terminal, service type=eMBB_App1, and priority=1; for the terminal, service type=eMBB_App2, and priority=2; and for the terminal, service type=mIoT, and priority=3.

The access network device may process subsequent different service types of service requests (including signaling and/or data) of the terminal that belong to a same network slice or different network slices based on the type of the service that the terminal subscribes to and that is supported by the AMF and the priority information of the service type in the received NS common QoS policy, for example, preferentially forward session management SM signaling related to a service whose service type has a high priority. Particularly, for an NSI 1, the access network device processes service requests of different services of the terminal in the NSI 1 based on the priority information of the type of the service that the terminal subscribes to.

312. The access network device forwards the registration response to the terminal.

313. The terminal processes subsequent different service types of service requests (including signaling and/or data) of a same network slice or different network slices based on the type of the service that the terminal subscribes to and that is supported by the AMF and the priority information of the service type in the received NS common QoS policy. Particularly, for an NSI 1, the terminal processes service requests (for example, different service types of service-related signaling carrying an NSI ID of the NSI 1, or user plane data (or referred to as a service data flow service data flow, or a quality of service flow QoS flow) of PDU sessions, established in the NSI 1, of services with different service types) of different services in the NSI 1 based on the priority information of the type of the service that the terminal subscribes to.

314. The terminal registers with another network slice NSI 2. A procedure is basically the same as a procedure of steps 301 to 312. Differences mainly lie in the following:

(1) Network slice selection assistance information NSSAI carried by the terminal in step 313 may be different from NSSAI in step 301. Therefore, an AMF in step 314 may be different from the AMF in steps 302 to 312. The AMF selects the NSI 2 for the terminal.

(2) If a serving AMF corresponding to the NSI 2 is different from a serving AMF corresponding to the NSI 1, and a type of a service that the terminal subscribes to and that is supported by a particular serving AMF and priority information of the service type are provided in steps 304 to 308, a procedure of steps 304 to 308 needs to be performed in a procedure in which the terminal registers with the network slice NSI 2; otherwise, steps 304 to 308 are not performed.

(3) The NSI 1 in steps 301 to 312 is replaced with the NSI 2.

315. The terminal processes subsequent different service types of service requests of a same network slice or different network slices based on the type of the service that the terminal subscribes to and that is supported by the AMF and the priority information of the service type in the received NS common QoS policy. Specifically, for the NSI 1 and the NSI 2, the terminal processes service requests of different services in the NSI 1 and the NSI 2 based on the priority information of the type of the service that the terminal subscribes to.

It should be noted that, in the embodiment shown in FIG. 5 in this application, the terminal processes a service request based on a priority of a service type of a service corresponding to the service request, without considering which slice (for example, the NSI 1 or the NSI 2) the service request belongs to.

In this embodiment of this application, priorities of a plurality of network slices are determined, so that the terminal, the AMF, or the access network device can preferentially process a service of a high-priority network slice based on the priorities when services of the network slices collide. In this way, a service request of an emergency or important network slice can be preferentially processed.

Figure 6:
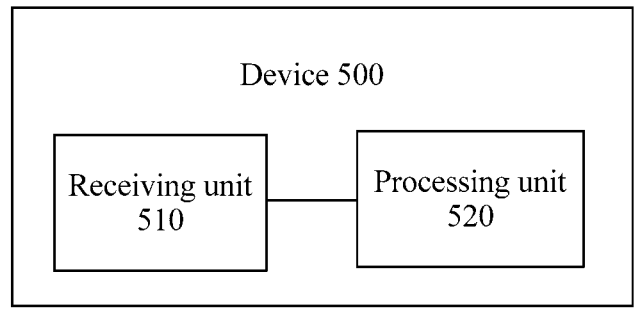
FIG. 6 is a schematic block diagram of a service processing device according to an embodiment of this application.

FIG. 6 is a schematic block diagram of a service processing device 500 according to an embodiment of this application. The device 500 may be a terminal. The device 500 includes:

a receiving unit 510, configured to receive a first message, where the first message includes first information of a first network slice, a priority corresponding to the first information, second information of a second network slice, and a priority corresponding to the second information; and a processing unit 520, configured to preferentially process a service of the high-priority network slice based on the priorities when a service of the first network slice collides with a service of the second network slice.

In this embodiment of this application, the foregoing priority information may be alternatively preconfigured on the terminal.

When receiving a high-priority service request (for example, an emergency communication service) in a process of processing a low-priority service, the terminal suspends processing (signaling processing or data transmission) of the low-priority service, and processes the high-priority service request. When simultaneously receiving two service requests, the terminal first processes a high-priority service. When having insufficient resources, the terminal may release a resource used for a low-priority service, and then process a high-priority service.

In this embodiment of this application, the terminal determines the first information of the first network slice, the priority corresponding to the first information, the second information of the second network slice, and the priority corresponding to the second information, to preferentially process the service of the high-priority network slice based on the priorities when the service of the first network slice collides with the service of the second network slice. In this way, the terminal can preferentially process a service request of an emergency or important network slice.

In this embodiment of this application, the first information of the network slice may include an identifier of the network slice, a network slice instance identifier, a slice/service type, or single network slice selection assistance information S-NSSAI.

In some possible implementations, the first message is a registration accept message, and the device 500 further includes: a sending unit, configured to send a registration request message to an access network device.

In some possible implementations, the processing unit 520 is specifically configured to: when a priority of the first network slice is the same as a priority of the second network slice, preferentially process a service of a high-load network slice; or the terminal randomly selects a network slice, and processes a service of the selected network slice; or the terminal preferentially processes a service that is of a network slice and that arrives first.

Figure 7:
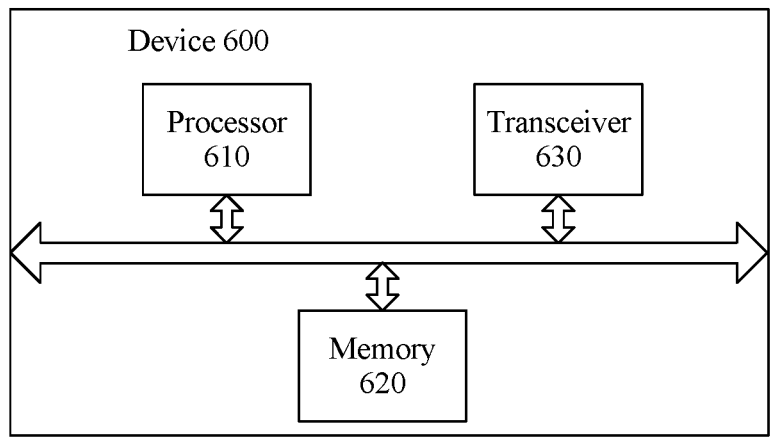
FIG. 7 is a schematic block diagram of a service processing device according to another embodiment of this application.

It should be noted that, in this embodiment of the present invention, the receiving unit 510 may be implemented by a transceiver, and the processing unit 520 may be implemented by a processor. As shown in FIG. 7, a device 600 may include a processor 610, a memory 620, and a transceiver 630. The memory 620 may be configured to store code to be executed by the processor 610, and the like.

In an implementation process, steps in the foregoing methods can be implemented by using a hardware integrated logical circuit in the processor 610, or by using instructions in a form of software. The steps of the methods disclosed with reference to the embodiments of the present invention may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory 620. The processor 610 reads information in the memory 620 and completes the steps in the foregoing methods in combination with hardware of the processor 610. To avoid repetition, details are not described herein again.

The device 500 shown in FIG. 6 or the device 600 shown in FIG. 7 can implement the processes corresponding to the foregoing method embodiments shown in FIG. 2 to FIG. 5. For details of the device 500 or the device 600, refer to the foregoing descriptions in FIG. 2 to FIG. 5. To avoid repetition, details are not described herein again.

Figure 8:
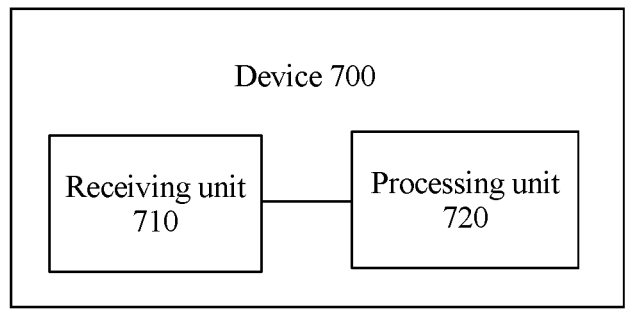
FIG. 8 is a schematic block diagram of a service processing device according to still another embodiment of this application.

FIG. 8 is a schematic block diagram of a service processing device 700 according to an embodiment of this application. The device 700 includes:

a receiving unit 710, configured to receive a first message, where the first message includes first information of one or more network slices that a terminal subscribes to and a priority corresponding to the first information; and a processing unit 720, configured to preferentially process a service of the high-priority network slice based on the priority when services of the plurality of network slices collide.

In this embodiment of this application, the device 700 may be an AMF. Specifically, the AMF may process (including forwarding) signaling of different network slices based on the priority, or the AMF may provide the priority for an access network device, so that the access network device processes (including forwarding) signaling of different network slices based on the priority.

When receiving a high-priority service request (for example, an emergency communication service) in a process of processing a low-priority service, the AMF suspends processing (signaling processing or data transmission) of the low-priority service, and processes the high-priority service request. When simultaneously receiving two service requests, the AMF first processes a high-priority service. When having insufficient resources, the AMF may release a resource used for a low-priority service, and then process a high-priority service.

In this embodiment of this application, the first information of the one or more network slices that the terminal subscribes to and the priority corresponding to the first information are determined, so that the service of the high-priority network slice can be preferentially processed based on the priority when the services of the plurality of network slices collide. In this way, the terminal can preferentially process a service request of an emergency or important network slice.

In this embodiment of this application, the first information of the network slice may include an identifier of the network slice, a network slice instance identifier, a slice/service type, or single network slice selection assistance information S-NSSAI.

In some possible implementations, the receiving unit 710 is specifically configured to:
receive the first message sent by a second device, where the first message includes the first information of the one or more network slices that the terminal subscribes to and the priority corresponding to the first information, and the second device is a user data management UDM or a policy control function PCF.

The device 700 further includes a first sending unit, configured to send a first request to the second device, where the first request is used to request the first information of the one or more network slices that the terminal subscribes to and the priority corresponding to the first information.

In some possible implementations, the receiving unit 710 is specifically configured to receive the first message sent by a policy function entity PCF, where the first message includes the priority corresponding to the first information of the network slice.

The device 700 further includes a second sending unit, configured to send a second request to the policy function entity PCF, where the second request is used to request a priority of a network slice that the terminal subscribes to, and the second request includes the first information.

In some possible implementations, the device 700 further includes a third sending unit, configured to send a registration accept message to the access network device, where the registration accept message includes the first information of the one or more network slices that the terminal subscribes to and the priority corresponding to the first information. The receiving unit 710 is further configured to receive a registration request message that is sent by the terminal and forwarded by the access network device.

The processing unit 720 is specifically configured to: when the plurality of network slices have a same priority, preferentially process a service of a high-load network slice; or randomly select a network slice, and process a service of the selected network slice; or preferentially process a service that is of a network slice and that arrives first.

Figure 9:
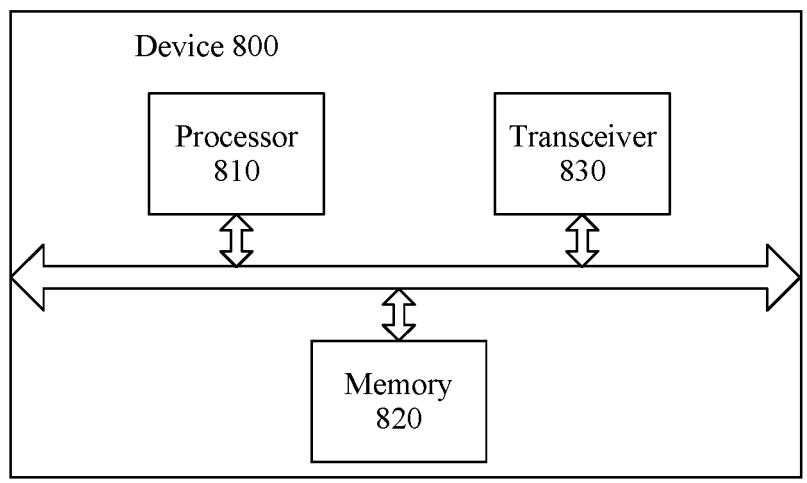
FIG. 9 is a schematic block diagram of a service processing device according to yet another embodiment of this application.

It should be noted that, in this embodiment of the present invention, the receiving unit 710 may be implemented by a transceiver, and the processing unit 720 may be implemented by a processor. As shown in FIG. 9, a device 800 may include a processor 810, a memory 820, and a transceiver 830. The memory 820 may be configured to store code to be executed by the processor 810, and the like.

In an implementation process, steps in the foregoing methods can be implemented by using a hardware integrated logical circuit in the processor 810, or by using instructions in a form of software. The steps of the methods disclosed with reference to the embodiments of the present invention may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory 820. The processor 810 reads information in the memory 820 and completes the steps in the foregoing methods in combination with hardware of the processor 810. To avoid repetition, details are not described herein again.

The device 700 shown in FIG. 8 or the device 800 shown in FIG. 9 can implement the processes corresponding to the foregoing method embodiments shown in FIG. 2 to FIG. 5. For details of the device 700 or the device 800, refer to the foregoing descriptions in FIG. 2 to FIG. 5. To avoid repetition, details are not described herein again.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A service processing method, comprising:
   receiving, by a terminal in a communication system wherein the communication system comprises at least a first network slice and a second network slice where the terminal accesses the first network slice and the second network slice simultaneously, first information of the first network slice, a priority corresponding to the first information, second information of the second network slice, and a priority corresponding to the second information;
   responsive to a collision of a service of the first network slice with a service of the second network slice, preferentially processing, by the terminal, a service of a high-priority network slice based on the priorities; and
   responsive to the priority of the first network slice being the same as the priority of the second network slice, preferentially processing one of the following:
      a service of a high-load network slice; or
      a service that is of a network slice and that arrives first.

2. The method according to claim 1, wherein the first information of the first network slice comprises one or more of the following:
   an identifier of the first network slice, a network slice instance identifier, single network slice selection assistance information (S-NSSAI), or a slice/service type; and
   the second information of the second network slice comprises one or more of the following:
      an identifier of the second network slice, a network slice instance identifier, S-NSSAI, or a slice/service type.

3. The method according to claim 1, wherein: the first information includes a priority of first service type, and the second information includes a second service type, preferentially processing, by the terminal, a service of the high-priority network slice based on the priorities, comprises:
   determining a higher priority of the first service type and the second service type;
   preferentially processing a service of a network slice corresponding to a higher-priority of a service type.

4. The method according to claim 1, further comprising receiving a first message including the first information of the first network slice, the priority corresponding to the first information, the second information of the second network slice, and the priority corresponding to the second information.

5. The method according to claim 4, wherein the first message is a registration accept message; and
   before the terminal receives the registration accept message, the method further comprises: sending, by the terminal, a registration request message to an access network device.

6. The method according to claim 1, wherein:
   each network slice includes:
      an identifier of each network slice that the terminal subscribes to and that is supported by an access and mobility management function (AMF) and priority information of each network slice instance.

7. The method according to claim 1, wherein:
   each network slice includes:
      a slice/service type of the network slice that the terminal subscribes to and that is supported by the AMF and priority information of each slice/service type.

8. The method according to claim 1, wherein:
   each network slice includes:
      one or more pieces of single network slice selection assistance information (S-NSSAI) of the network slice that the terminal subscribes to and that is supported by the AMF and priority information corresponding to each piece of S-NSSAI.

9. A service processing method, comprising:
   receiving, by an access and mobility management function (AMF) in a communication system wherein the communication system comprises a plurality of network slices accessed simultaneously by at least one terminal, the AMF being shared by the plurality of network slices, first information of the plurality of network slices that a terminal subscribes to and a priority corresponding to the first information;
   responsive to services of the plurality of network slices colliding, preferentially processing, by the AMF, a service of a high-priority network slice based on the priority; and
   responsive to the plurality of network slices being the same, preferentially processing one of:
      a service of a high-load network slice; or
      a service that is of a network slice and that arrives first.

10. The method according to claim 9, wherein the receiving, by the AMF, comprises:
    receiving, by the AMF, a first message that includes the first information sent by a second device, wherein the first message comprises first information of one or more network slices that the terminal subscribes to and the priority corresponding to the first information, and the second device is a user data management (UDM) or a policy control function (PCF); and
    before the receiving, by an AMF, the first message, the method further comprises:
       sending, by the AMF, a first request to the second device, wherein the first request is used to request the first information of the one or more network slices that the terminal subscribes to and the priority corresponding to the first information.

11. The method according to claim 10, wherein the first information of the network slice comprises one or more of the following:
    an identifier of the high-priority network slice, a network slice instance identifier, single network slice selection assistance information (S-NSSAI), or a slice/service type.

12. The method according to claim 10, after the receiving, by the AMF, further comprising:
- sending, by the AMF, a registration accept message to an access network device, wherein the registration accept message comprises a first message that includes the first information of one or more network slices that the terminal subscribes to and the priority corresponding to the first information; and
- before the receiving, by an AMF, the first message, the method further comprises:
  - receiving, by the AMF, a registration request message that is sent by the terminal and forwarded by the access network device.

13. The method according to claim 9, wherein the receiving, by the AMF, comprises:
- receiving, by the AMF, a first message that includes the first information sent by a policy function entity (PCF), wherein the first message comprises the priority corresponding to the first information of the high-priority network slice; and
- before the receiving, by an AMF, the first message, the method further comprises:
  - sending, by the AMF, a second request to the policy function entity PCF, wherein the second request is used to request a priority of the high-priority network slice that the terminal subscribes to, and the second request comprises the first information.

14. The method according to claim 9, wherein each network slice:
- an identifier of each network slice instance that the terminal subscribes to and that is supported by the AMF and priority information of each network slice instance.

15. The method according to claim 9, wherein each network slice includes one of the following:
- a slice/service type of the network slice that the terminal subscribes to and that is supported by the AMF and priority information of each slice/service type; or
- one or more pieces of single network slice selection assistance information (S-NSSAI) of the network slice that the terminal subscribes to and that is supported by the AMF and priority information corresponding to each piece of S-NSSAI.

16. An apparatus in a communication system, wherein the communication system comprises:
- at least one processor; and
- at least one memory, the at least one memory comprising instructions that when executed by the at least one processor, cause the apparatus to perform, at least, the following while the first network slice and the second network slice are accessed simultaneously:
  - receiving first information of a first network slice, a priority corresponding to the first information, second information of a second network slice, and a priority corresponding to the second information;
  - responsive to a service of the first network slice colliding with a service of the second network slice, preferentially processing a service of a high-priority network slice based on the priorities; and
  - responsive to the priority of the first network slice being the same as the priority of the second network slice, preferentially processing one of the following:
    - a service of a high-load network slice; or
    - a service that is of a network slice and that arrives first.

17. The apparatus according to claim 16, wherein the first information of the first network slice comprises one or more of the following:
- an identifier of the first network slice, a network slice instance identifier, single network slice selection assistance information (S-NSSAI), or a slice/service type; and
- the second information of the second network slice comprises one or more of the following: an identifier of the second network slice, a network slice instance identifier, S-NSSAI, or a slice/service type.

18. The apparatus according to claim 16, wherein receiving the first information, the priority corresponding to the first information, the second information, and the priority corresponding to the second information comprises receiving a first message including the first information of the first network slice, the priority corresponding to the first information, second information of the second network slice, and the priority corresponding to the second information.

19. The apparatus according to claim 18, wherein a first message that includes the first information is a registration accept message; and
- the at least one memory further comprising instructions that when executed by the at least one processor, cause the apparatus to perform, at least, the following:
  - sending a registration request message to an access network device before the apparatus receives the registration accept message.

* * * * *